(12) United States Patent
Carberry et al.

(10) Patent No.: US 8,101,535 B2
(45) Date of Patent: Jan. 24, 2012

(54) CERAMIC BALLISTIC ARMOR PRODUCT

(75) Inventors: John Carberry, Talbott, TN (US);
Jennifer Norwood, Westville, NJ (US);
Katherine T. Leighton, Media, PA (US); Kyle Hoff, Aston, PA (US); Carl Cline, Danville, CA (US)

(73) Assignee: Schott Diamondview Armor Products, LLC, Boothwyn, PA (US)

( * ) Notice: Subject to any disclaimer, the term of this patent is extended or adjusted under 35 U.S.C. 154(b) by 944 days.

(21) Appl. No.: 12/019,348

(22) Filed: Jan. 24, 2008

(65) Prior Publication Data
US 2011/0314997 A1 Dec. 29, 2011

Related U.S. Application Data

(63) Continuation-in-part of application No. 11/957,839, filed on Dec. 17, 2007, which is a continuation-in-part of application No. 11/612,172, filed on Dec. 18, 2006, now abandoned.

(51) Int. Cl.
*C04B 35/573* (2006.01)
*F41H 5/00* (2006.01)

(52) U.S. Cl. .............. 501/62; 501/91; 501/96.3

(58) Field of Classification Search ............ 501/91, 501/92, 96.3; 89/36.02
See application file for complete search history.

(56) References Cited

U.S. PATENT DOCUMENTS

| | | | | |
|---|---|---|---|---|
| 3,765,300 A | * | 10/1973 | Taylor et al. | 89/36.02 |
| 3,796,564 A | * | 3/1974 | Taylor et al. | 264/29.1 |
| 3,808,012 A | * | 4/1974 | Bailey et al. | 501/91 |
| 4,154,787 A | * | 5/1979 | Brown | 264/101 |
| 4,869,175 A | | 9/1989 | McDougal | |
| 5,294,489 A | | 3/1994 | Luthra et al. | |
| 5,340,655 A | | 8/1994 | Creber et al. | |
| 5,502,011 A | | 3/1996 | Yamamoto et al. | |
| 5,640,666 A | | 6/1997 | Jayashankar et al. | |
| 5,783,297 A | | 7/1998 | Wise et al. | |
| 6,805,034 B1 | * | 10/2004 | McCormick et al. | 89/36.01 |
| 6,862,970 B2 | * | 3/2005 | Aghajanian et al. | 89/36.02 |
| 6,895,851 B1 | | 5/2005 | Adams et al. | |
| 6,995,103 B2 | * | 2/2006 | Aghajanian | 501/88 |
| 7,104,177 B1 | | 9/2006 | Aghajanian et al. | |
| 7,332,221 B2 | * | 2/2008 | Aghajanian et al. | 428/408 |
| 2002/0144773 A1 | | 10/2002 | Richmond et al. | |
| 2003/0092558 A1 | * | 5/2003 | Aghajanian | 501/91 |
| 2003/0110931 A1 | * | 6/2003 | Aghajanian et al. | 89/36.01 |
| 2004/0065868 A1 | * | 4/2004 | Aghajanian et al. | 252/500 |

* cited by examiner

*Primary Examiner* — Karl Group
(74) *Attorney, Agent, or Firm* — Ohlandt, Greeley, Ruggiero & Perle, LLP

(57) ABSTRACT

A ceramic ballistic material and method of manufacture is disclosed. A filler material is provided. The filler material is divided into filler granules collectively having a median diameter approximately 10 microns or less. An amount of carbon is provided. The carbon is divided into carbon particles and the carbon particles are allowed to coat the filler granules. The mixture of carbon-coated filler granules is formed into a ballistic armor shape. The formed mixture is placed in a substantial vacuum. The mixture is introduced to a pre-selected amount of silicon and the mixture of carbon-coated filler granules and silicon is heated to a temperature at or above the melting point of the silicon.

5 Claims, 6 Drawing Sheets

CERAMIC BALLISTIC ARMOR PRODUCT

CROSS-REFERENCE TO RELATED APPLICATIONS

This application is a Continuation-In-Part of U.S. application Ser. No. 11/957,839, filed Dec. 17, 2007; which is a Continuation-In-Part of U.S. application Ser. No. 11/612,172, filed Dec. 18, 2006, now abandoned.

STATEMENT REGARDING FEDERALLY-SPONSORED RESEARCH OR DEVELOPMENT

Not Applicable

BACKGROUND OF THE INVENTION

1. Field of Invention

The invention relates to ballistic ceramic armor. More particularly, this invention pertains to a ballistic ceramic armor manufactured from a composite ceramic material product, and a method for manufacturing the same.

2. Description of the Related Art

In order to provide protection of personnel and equipment from ballistic projectiles, explosive ordnance, and forces and objects from detonation of improvised explosive devices (collectively hereinafter "projectiles"), it is necessary to provide a means of disbursing the kinetic energy of such projectiles to prevent them from reaching their target. Although this may be accomplished by interposing a large mass of any of a number of different materials between the target and the incoming projectile, experience has shown that a much more efficient means of energy disbursement is provided by suitably engineered ballistic armor structures wherein at least one layer of material acts to disrupt an incoming projectile. Such a structure strives to maximize the amount of material which may be acted upon to absorb and disburse the energy of the projectile, while at the same time breaking or deforming the projectile and distributing these resulting fragments into a wider area. Such a structure further strives to minimize the total amount of materials required for the protection of a specific area.

Ballistic armor structures generally include one or more layers of material engineered to spread the force of the impact by deforming, deflecting, or fragmenting the ballistic projectile while the ballistic armor itself undergoes deformation or localized fragmentation. The deformation and localized fragmentation processes of the ballistic armor structure absorb a large portion of energy from the projectile while simultaneously spreading the impacted area to involve more material in successive layers. Both hardness and toughness of the ballistic armor structure are required for these functions.

In recent decades, certain hard ceramic materials have been developed for certain ballistic armor applications. These ballistic ceramic materials, such as alumina, boron carbide, silicon carbide, and titanium diboride ceramics provide the advantage of being lighter in mass than steel and provide ballistic stopping power comparable to steel. Ballistic ceramics are extraordinarily hard, strong in compression, and relatively light weight, making them efficient at eroding and shattering armor-piercing threats. Thus, in applications in which having armor with the lowest possible mass is important, such as human body armor and aircraft armor, ballistic ceramic materials are useful.

A common method of manufacture of structures made of ballistic ceramic materials is to sinter components of ballistic ceramic materials to form the structure using hot pressing. In a hot pressing process, particles of ceramic material are subjected to elevated temperature and then subjected to increased isostatic gas pressure in an autoclave. An inert gas is used to discourage chemical reaction of the ceramic material. The increased temperature causes the ceramic material to undergo a process called sintering, whereby the particles adhere to each other. Thereafter, the increased pressure and temperature encourages grain boundary diffusion to allow for increased densification of the structure.

In using a hot pressing process to manufacture ballistic ceramic materials, pressures exceeding 2,000 psi and temperatures in the range of 1,500 to 2,240 degrees Centigrade, depending on the particular constituent materials used, are necessary to achieve sufficient adhesion of the ballistic ceramic particles. The need to achieve and maintain such high temperatures and pressures makes manufacture of hot pressed ballistic ceramics a costly endeavor, thereby resulting in increased cost to the consumer of the ballistic ceramic material.

Reaction bonding has been used as an alternative in manufacturing ballistic ceramic structures. In reaction bonding, a composite is formed of ceramic particles bonded in a matrix of in situ formed ceramic material. In this process, ceramic particles are mixed with carbon and a sintering aid, such as silicon. The mixture is then heated to a point at which a portion of the carbon and the sintering aid react to form a composite ceramic consisting of ceramic particles distributed throughout a matrix of ceramic material. This reaction results in a semi-continuous phase of sintering aid distributed throughout the composite, with discontinuous ceramic material phases bonding discontinuous phases of ceramic particles.

The reaction bonding process poses several attractive advantages to manufacture of ballistic ceramic structures over hot pressing. Less pressure and temperature are necessary to carry on the reaction bonding process as opposed to hot pressing, thereby making reaction bonding more economical. Also, reaction bonding is accomplished using the relatively inexpensive raw materials of the ballistic ceramic materials, such as silicon and carbon together with the ballistic ceramic particles.

However, despite the advantages of reaction bonding, the performance and quality of reaction-sintered ballistic ceramic composite material has traditionally been deemed inferior to hot pressed ballistic ceramic material. Ceramics inherently contain flaws such as micro cracks, porosity, voids, impurities, and residual stresses from processing that can serve as sites for initiation of failure by mechanisms such as intergranular flow, sliding and micro cracking within the initial or reflected stress wave states. U.S. Pat. Nos. 7,104,177; 6,995,103; and 6,862,970 each disclose the use of silicon as an agent to react with carbon and form silicon carbide as a phase that bonds a filler ceramic, either boron carbide or silicon carbide, together with approximately 10-20 percent of unreacted silicon remaining in the composite. Certain publications have theorized that this amount of excess silicon is deleterious to the ballistic performance of the finished ceramic material. As is set out in V. Domnich and Y. Gogotsi, *Phase Transformation in Silicon Under Contact Loading*, Rev. Adv. Mater. Sci. 3, 1-36 (2002), the amount of excess silicon ultimately leads to void formation and failure sites upon impact by a ballistic projectile.

Moreover, in traditional reaction bonding, organic materials, such as graphite, are added to the suspended ballistic ceramic particles without assuring that the organic materials would cover the surface of all suspended ballistic ceramic particle grains. As a result, the reaction bonded silicon carbide occurs in a discontinuous phase throughout the composite, with uneven distribution of silicon carbide and relatively low surface area contact between the silicon carbide and filler particles. This lack of uniformity of silicon carbide distribution leads to imperfections within the ceramic composite, which in turn leads to decreased strength and toughness of the ceramic composite. Thus, quality control of the resulting ceramic composite is difficult to maintain using traditional reaction bonding techniques. Furthermore, the use of silicon as a continuous phase is hampered by the tendency for molten silicon to vaporize at temperatures above 1,414 degrees Centigrade. As silicon vapor escapes the colloidal mixture during formation of the ceramic product, it leaves behind degassing channels, which weaken the structural integrity of the ceramic product.

In order to apply reaction bonded ceramic composites to a ballistic armor application, more uniform bonding between the suspended ballistic ceramic particles and the in situ formed ceramic matrix is important. Ceramic bodies tend to exhibit stronger and more reliable properties when they are uniformly fine grained, fully dense, and non-porous. Microstructure is known to influence dynamic properties thought to relate to dynamic yield strength. For example, N. K. Bourne, et al. "The Effect of Microstructural Variations upon the Dynamic Compressive and Tensile Strengths of Aluminas" *Proceedings: Mathematical and Physical Sciences*, Vol. 446, No. 1927 (Aug. 8, 1994), pp. 309-318, discloses that smaller grain size corresponds to a higher Hugoniot Elastic Limit (HEL) in ceramic materials. In sintered ceramics, a higher glassy grain boundary phase is associated with lower strength, thus indicating that a ceramic with smaller grain size and reduced amount of second "bonding" phase exhibits improved dynamic properties and resistance to failure in dynamic impact conditions. Thus, suspending small particles of a relatively hard ballistic ceramic material, such as boron carbide, within a uniform and substantially continuous phase of softer yet tougher ceramic material, such as silicon carbide, would allow for a composite ballistic ceramic material capable of exhibiting increased overall strength and toughness.

As has been mentioned above, boron carbide and silicon carbide are sometimes used as filler materials for ballistic ceramic composites. However, other possible fillers are known. In particular, under certain conditions boron carbide (chemical formula $B_4C$) reacts with silicon to form a crystal lattice in which silicon atoms and boron atoms are substituted for some of the carbon atoms within the lattice. The substitution of larger silicon atoms for carbon atoms at certain positions in the lattice framework results in an expanded lattice with the chemical formula $B_{12}(B,C,Si)_3$. The expansion of the crystal lattice also allows for the insertion of interstitial atoms into some of the gaps in the lattice framework. Overall, the expansion of the lattice and the interstitial insertion of atoms create a filler material having physical properties more desirable for ballistic armor applications than ordinary boron carbide. See R. Telle, "Structure and Properties of Si-Doped Boron Carbide," *The Physics and Chemistry of Carbides; Nitrides and Borides* (Ed. by R. Freer, Kluwer Academic Publishers, Netherlands, 1990), 249-67. Hereafter, the expanded lattice formed from the reaction of silicon with normal boron carbide will be referred to as "expanded lattice boron carbide."

In manufacturing a reaction bonded ballistic ceramic composite having a fine grained filler distribution; a problem arises in appropriating a filler material of sufficiently small grain size. Specifically, finely divided ceramic material suitable for use as filler is significantly more expensive than large grained ceramic material of equal purity. Moreover, a second problem arises in disbursing organic materials evenly throughout the fine grained filler material. In traditional processes of dividing a large grained ceramic material into a more fine grained material, the opportunity for contaminants to adhere to the surface of the filler granules is great. Similarly, in traditional processes of dividing carbon and other organic materials into material of sufficient grain size to allow for disbursement within the fine grained filler material, the opportunity for contaminants to oxidize portions of the organic material is great. Such contamination of the fine grained filler material and the organic material leads to reduced bonding between the filler material and the organic material, thereby reducing the amount of surface to surface contact between the continuous-phase in-situ-formed ceramic material and the filler material. Such reduced surface-to-surface contact ultimately results in greater instances of weak points in the product ceramic composite.

BRIEF SUMMARY OF THE INVENTION

A ceramic ballistic armor and method for manufacture is disclosed. A large grained filler material is provided, which is generally a ballistic ceramic material such as boron carbide, $AlB12$, silicon carbide, titanium boride, or other such ballistic ceramic material. An amount of carbon is also provided. In a grinding step, the filler material is divided into a number of filler granules, with the filler granules collectively having a median diameter less than approximately 10 microns. In a grinding and coating step, the carbon is divided into carbon particles collectively having a median diameter less than 1 micron, and the carbon particles are allowed to coat the filler granules.

In one embodiment, the grinding step and the grinding and coating step are accomplished through a method for rapidly reducing the particle size of graphite. In this embodiment, the filler material and the amount of carbon are combined in an attrition mill, which includes an amount of grinding media. An inert cover is provided to the filler material and the carbon. Thereafter, the attrition mill is operated to grind the filler material and the carbon in order to form filler granules together with graphite particles. Operation of the attrition mill occurs until the graphite particles are reduced to having a collective average diameter less than one micron.

Following the grinding and coating steps, the mixture is formed into a ballistic armor shape. In one embodiment, this forming is preceded by an optional addition of an organic binder to the mixture to aid in forming the mixture to the desired shape, and to aid in retaining the mixture within the desired shape. The formed mixture is then placed in a substantial vacuum, and the mixture is then exposed to a pre-selected amount of silicon. The formed mixture and silicon are heated to a temperature at or exceeding 1,450 degrees Centigrade. Upon reaching a temperature at or around 1,450 degrees Centigrade, the silicon within the mixture reacts with the carbon particles substantially coating the filler particles. The silicon and carbon form a matrix of silicon carbide throughout the mixture, thereby suspending the filler granules within the silicon carbide matrix. At the same time, residual silicon within the formed body reacts with boron carbide present in the filler granules to form an expanded lattice boron carbide.

In one embodiment of the present invention, a pre-selected amount of silicon particles is provided. After agitation of the filler granules and carbon particles sufficient to substantially cover the filler granules in carbon particles, the resultant coated filler granules are mixed with the pre-selected amount of silicon particles. To accomplish proper disbursement of the silicon particles within the coated filler mixture, the silicon particles are selected to have an average diameter between 10 microns and 200 nanometers. In this embodiment, the disbursed silicon particles react with the carbon particles substantially coating the filler particles during the heating step to produce the silicon carbide matrix.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Accordingly, a ceramic ballistic armor and method for manufacture is disclosed herein. The ceramic ballistic armor of the present invention provides a reaction bonded ceramic composite ballistic armor structure having a relatively uniformly fine grained distribution, including relatively uniformly distributed and finely divided filler suspended throughout a silicon carbide matrix. In a preferred embodiment, the method for manufacture of the ceramic ballistic armor utilizes a method for rapidly reducing the particle size of graphite. The ceramic ballistic armor includes finely divided filler bonded by in situ formed silicon carbide covering substantially all of the surface area of the filler. In one embodiment, free metallic silicon is distributed within the matrix to fill the voids remaining within the ceramic ballistic armor following the in situ reaction of silicon to carbon.

Figure 1:
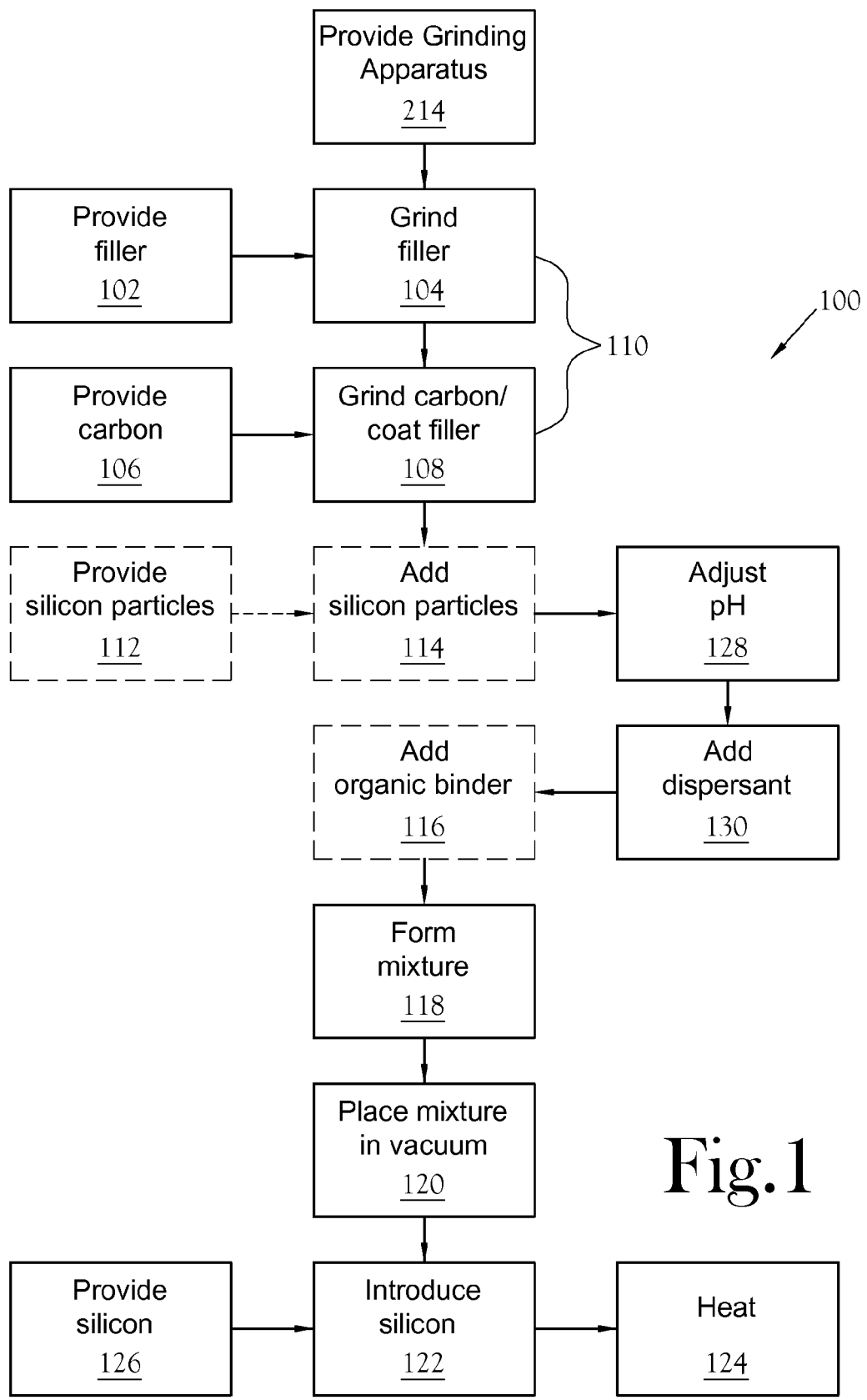
FIG. 1 is a flowchart showing the steps (including three optional steps) of one method for manufacturing a ceramic ballistic armor in accordance with one embodiment of the present invention.

Referring now to the Figures, a process for the manufacture of ceramic ballistic armor is schematically represented generally at 100 in FIG. 1. The illustrated process 100 allows for the provision 102 of a large grained filler material which is generally a ballistic ceramic material such as boron carbide, AlB12, silicon carbide, titanium boride, or other such ballistic ceramic material. In certain more discreet embodiments, the filler material is selected from the group consisting of boron carbide, silicon carbide, and aluminum dodecaboride. However, those skilled in the art will recognize other ceramic materials suitable for use as the filler material. To this extent, alumina and titanium diboride ceramics are contemplated. Furthermore, the combination of more than one type of ceramic material, such as a combination of boron carbide and silicon carbide, or other combinations, is also contemplated.

At least one grinding apparatus is provided at 214. The filler material is ground at 104 in the at least one grinding apparatus into a number of filler granules, with the filler granules collectively having a median diameter less than approximately 10 microns. In several more discreet embodiments, the filler material is ground 104 such as to exhibit a plurality of modes. For example, in one embodiment, the filler granules exhibit a first mode having a median diameter of approximately 10 microns, a second mode having a median diameter of approximately 5 microns, a third mode having a median diameter of approximately 3 microns, and a fourth mode having a median diameter of approximately 1 micron. Those skilled in the art will recognize that numerous combinations of grain size exist which are suitable for the filler granules. To this extent, both a bimodal grain-size distribution and a trimodal grain-size distribution are contemplated.

A pre-selected amount of carbon is provided at 106. In one embodiment, the carbon is provided in the form of graphite. However, those skilled in the art will recognize other sources of carbon which may be used without departing from the spirit and scope of the present invention. In a grinding and coating step 108, the carbon is ground into carbon particles and the carbon particles are mixed with the filler granules such that the carbon particles are allowed to coat the filler granules. The amount of carbon provided is selected to be sufficient to allow the subsequently ground carbon particles to substantially coat the filler granules. In an embodiment utilizing boron carbide as the filler material, an amount of carbon selected to weigh from 5-10% of the weight of the filler material is typical for filler material of particle size as described above. However, those skilled in the art will recognize that the specific proportion of carbon to filler material by weight is dependent upon the specific ceramic substance utilized in the filler material.

Figure 2:
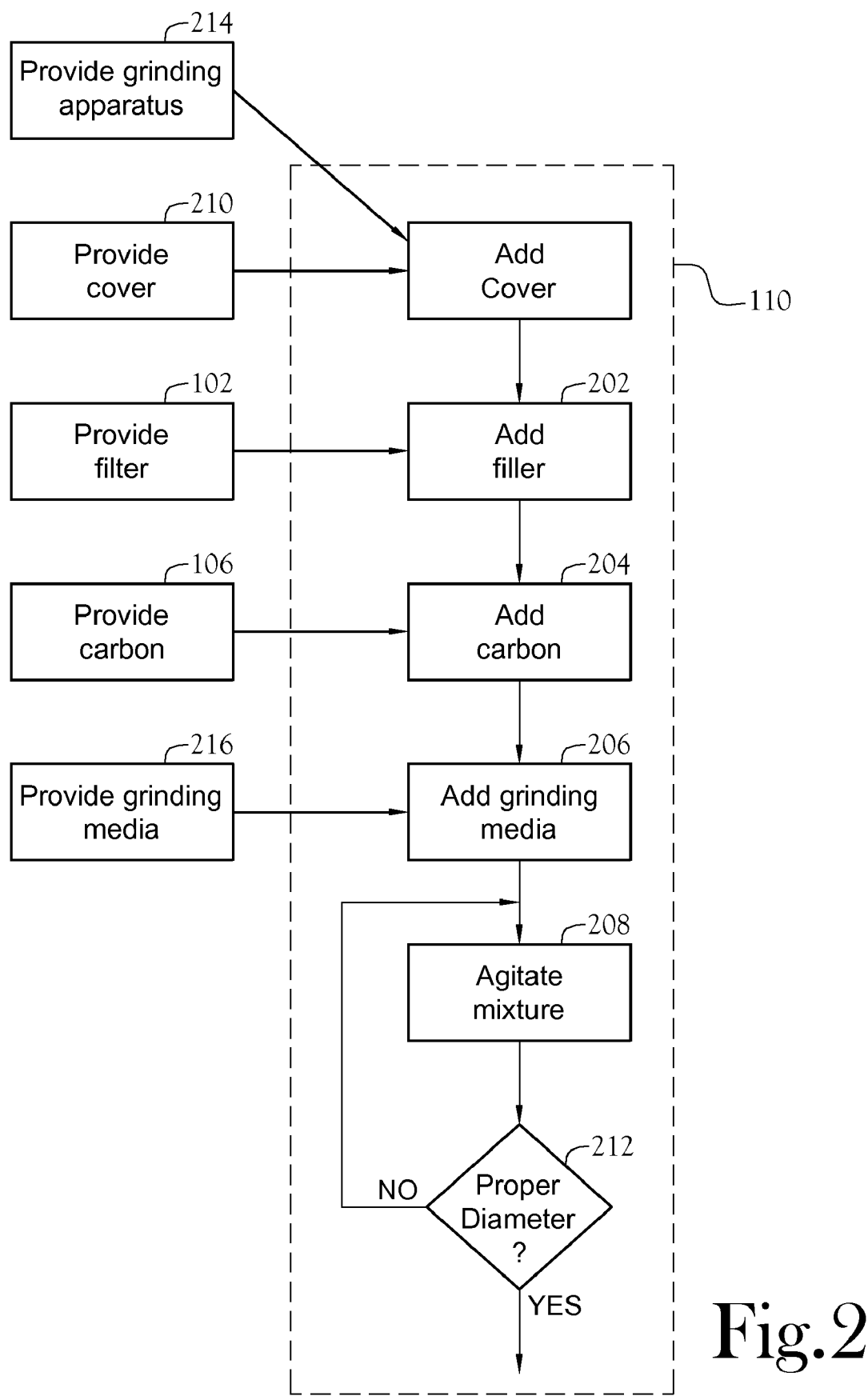
FIG. 2 is a flowchart showing more detailed steps for accomplishing the grinding and coating steps of FIG. 1.

FIG. 2 is a more detailed flow diagram of the process accomplished in the grinding 104 and coating 108 steps of FIG. 1. Referring to FIG. 2, in one embodiment, the step of grinding the filler material 104 and the step of grinding the carbon and coating the filler material 108 of FIG. 1 are accomplished simultaneously at 110, by combining the filler material 202 with the amount of carbon 204 in the at least one grinding apparatus. A suitable grinding media is provided at 216 to accomplish division of the filler material and the carbon. In the illustrated embodiment, the grinding media is composed of a chemically stabilized zirconia, such as yttria-stabilized zirconia. However, magnesium-stabilized zirconia, calcium-stabilized zirconia, and cerium-stabilized zirconia, as well as steel, tungsten carbide, and other such materials are contemplated for use as the grinding media. Those skilled in the art will recognize other suitable substances to accomplish the grinding media.

The grinding media is added to the at least one grinding apparatus at 206. The grinding apparatus agitates the filler material, carbon, and grinding media at 208 such that the filler material is divided 104 into a number of filler granules, with the filler granules collectively having a median diameter of approximately 10 microns. At the same time, the carbon is divided into carbon particles having a sufficiently small average diameter to facilitate covering each of the filler granules with carbon particles 108. The agitation 208 of the filler material, carbon, and grinding media further serves to distribute 108 the carbon particles within the number of filler granules such that carbon particles are allowed to substantially cover each of the filler granules.

In a preferred embodiment, an attrition mill, such as those attrition mills manufactured by UNION PROCESS®, is selected 214 to provide the grinding apparatus, due to the ability of the attrition mill to provide rapid division of the filler material and carbon with relatively high energy efficiency as compared to other grinders. In this embodiment, after combining the filler material 202 with the amount of carbon 204 and the grinding media 206 in the attrition mill, the steps of grinding the filler material 104 and of grinding the carbon and coating the filler material 108 with the resultant carbon particles occur simultaneously within the attrition mill. As noted above, the grinding apparatus agitates the filler material, carbon, and grinding media at 208 such that the grinding media divides the filler material 104 into a number of filler granules, with the filler granules collectively having a median diameter of approximately 10 microns. As the grinding media divides the filler material, both the grinding media and the filler material 104 serve to divide the carbon 108 into carbon particles having a median diameter of less than one micron, and preferably, less than 200 nanometers. In this manner, the simultaneous grinding of the filler material 104 and carbon 108 allows for carbon particles to coat the filler granules.

While grinding of the filler material 104 and the carbon 108 within an attrition mill allows for rapid division of the filler material and carbon with relatively high energy efficiency as compared to other grinders, those skilled in the art will recognize that such rapid division of the filler material is not necessary to accomplish the process of the present invention. Therefore, those skilled in the art will recognize other devices suitable for use to accomplish the grinding processes.

As a benefit of grinding of the filler material 104 and grinding the carbon simultaneously, as illustrated in FIG. 2, the substantial covering of the filler granules by the carbon particles 108 occurs during the division of the filler material, thereby reducing the amount of outside contaminants allowed to adhere to the filler granules. To further allow for the division of the filler material and carbon absent the interference of outside contaminants, an inert cover is provided at 210 to substantially seal the filler material and carbon and to exclude atmospheric gasses from the filler material and carbon during the grinding process 110. In a preferred embodiment, the inert cover is provided 210 by soaking the filler material and carbon in liquid ethanol during the grinding process 110. In another embodiment, the inert cover is provided 210 by containing the grinding apparatus within an atmosphere of argon gas. Those skilled in the art will recognize other materials and procedures suitable for use in providing the inert cover 210 without departing from the spirit and scope of the present invention.

Referring again to FIG. 2, agitation 208 of the filler material, carbon, and grinding material, occurs for a selected period of time. Following the selected period of time of agitation 208 of the filler material, carbon, and grinding media, an inquiry 212 is performed to determine if the filler material and carbon are within the desired range of particle diameter. If a proper diameter has been reached, further steps in the process 100 are performed. If a proper diameter has not been reached, agitation 208 of the filler material, carbon, and grinding media is continued for another selected period of time, upon which the inquiry 212 is repeated until the desired range of particle diameter is achieved.

Figure 3:
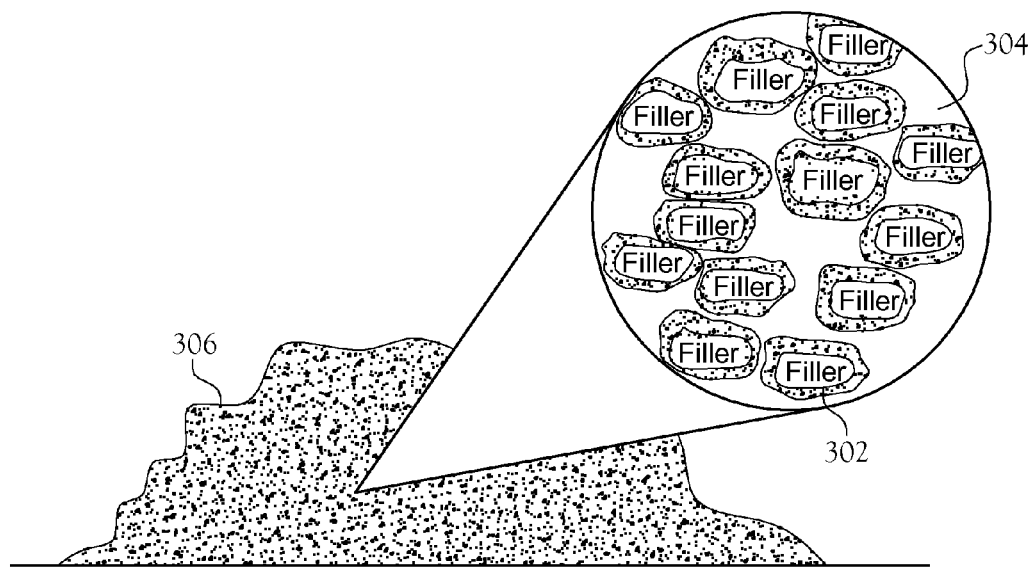
FIG. 3 is a cross-sectional view of an amount of the carbon-coated filler granules produced in the grinding and coating steps of FIG. 1 absent the optional addition of silicon particles, showing an enlarged view of a section of the carbon-coated filler granules.

FIG. 3 is a diagram showing a mixture 306 of the filler granules 302 coated in carbon particles 304. It will be understood that FIG. 3 is merely a schematic diagram, and that relative diameters of the particles of the filler granules, the carbon particles, and the silicon dust are not depicted to scale. As shown in FIG. 3, the agitation 208 of the filler material and the carbon results in distribution of carbon particles 304 within the filler granules 302, with the carbon particles 304 separating the filler granules 302 from each other.

Referring now to FIG. 1, in addition to coating 108 of the filler granules with carbon particles, a silicon source is provided to the mixture of ground filler granules coated with carbon particles. In an optional step of the present invention, a pre-selected amount of silicon particles is provided at 112. The pre-selected amount of silicon particles is selected to be sufficient to substantially occupy the voids between the carbon-coated filler granules. Typically, the pre-selected amount of silicon particles is selected to have a mass in the range of 20-40% of the mass of the filler material. In several more discreet embodiments, at least a portion of the silicon particles is optionally substituted with further additions of granular carbon.

After agitation 208 of the filler granules and carbon particles sufficient to grind the filler granules 104 to an acceptable median particle diameter, and to grind the carbon particles 108 to an acceptable median particle diameter and substantially cover the filler granules with carbon particles, the resultant coated filler granules are optionally mixed at 114 with the pre-selected amount of silicon particles provided at 112. To accomplish proper disbursement of the silicon particles within the coated filler mixture, the silicon particles are selected to have an average diameter between 10 microns and 200 nanometers. As shown in FIG. 1, the silicon particles are added to the coated filler granules following agitation 208 and grinding of the filler granules 104 and the carbon particles 108. However, those skilled in the art will recognize that the addition of silicon particles 114 can happen at any of numerous points during or following the grinding process 110. To this extent, the addition of silicon particles 114 to the filler material and carbon mixture is contemplated to occur following the coating of the filler 108, as well as at any point during or before the agitation process 208.

Figure 4:
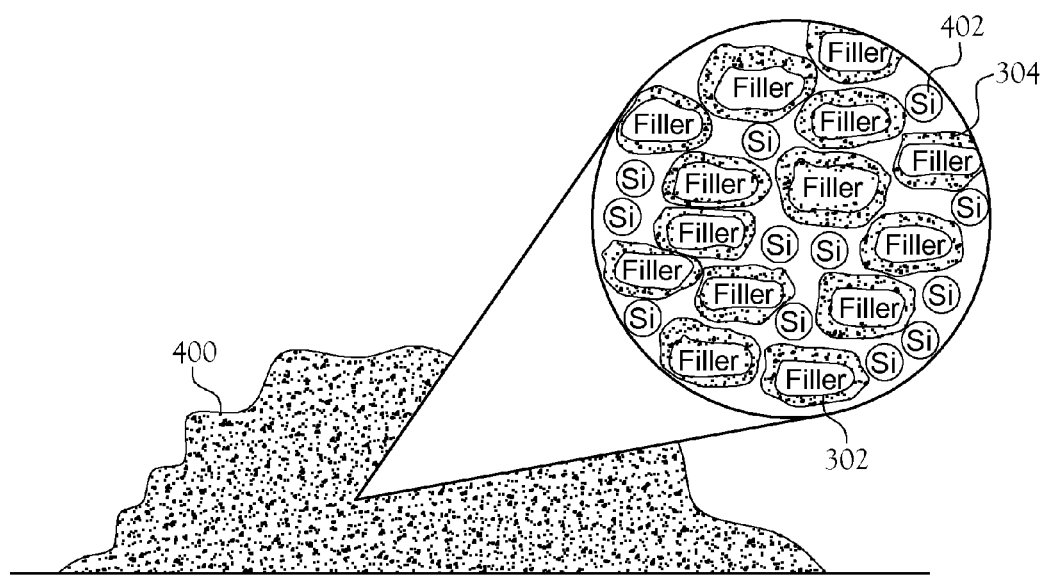
FIG. 4 is a cross-sectional view of an amount of the carbon-coated filler granules produced in the grinding and coating steps of FIG. 1, showing an enlarged view of a section of the carbon-coated filler granules with the silicon particles added to the mixture.

FIG. 4 is diagram showing a mixture 400 of the filler granules 302 coated in carbon particles 304, and the silicon particles 402 added at 114. It will be understood that FIG. 4 is merely a schematic diagram, and that relative diameters of the particles of the filler granules 302, the carbon particles 304, and the silicon dust 402 are not depicted to scale. As shown in FIG. 4, the addition 114 of silicon particles 402 to the coated filler granules, following agitation 208 of the filler material and the carbon, results in distribution of the silicon throughout the carbon particles 304, with the carbon particles 304 separating the filler granules 302 from one another.

Referring again to FIG. 1, following the grinding 104 and coating 108 steps in the process invention 100, and either prior to or following the optional addition at 114 of the silicon particles, the pH of the mixture is adjusted to basic at 128. Thereafter, an anionic dispersant is added 130 to the mixture to discourage agglomeration of the individual carbon particles. The mixture is then formed at 118 into a shape corresponding to a desired ceramic ballistic armor structure. In one embodiment of the present invention, this forming 118 is preceded by an optional adding 116 of an amount of organic binder to the mixture. The organic binder is provided to aid in forming the mixture to the desired ballistic armor structure shape, and to aid in retaining the mixture within the desired shape. The organic binder further serves to provide an increased source of carbon to the mixture to increase the amount of in-situ-formed silicon carbide. In one embodiment, the organic binder is a medium stiffness polyvinyl alcohol. In another embodiment, the organic binder is an organometallic substance. However, those skilled in the art will recognize other substances suitable for use as the organic binder. Following the optional adding 116 of organic binder, the mixture is formed 118 to the ballistic armor structure shape.

Figure 5:
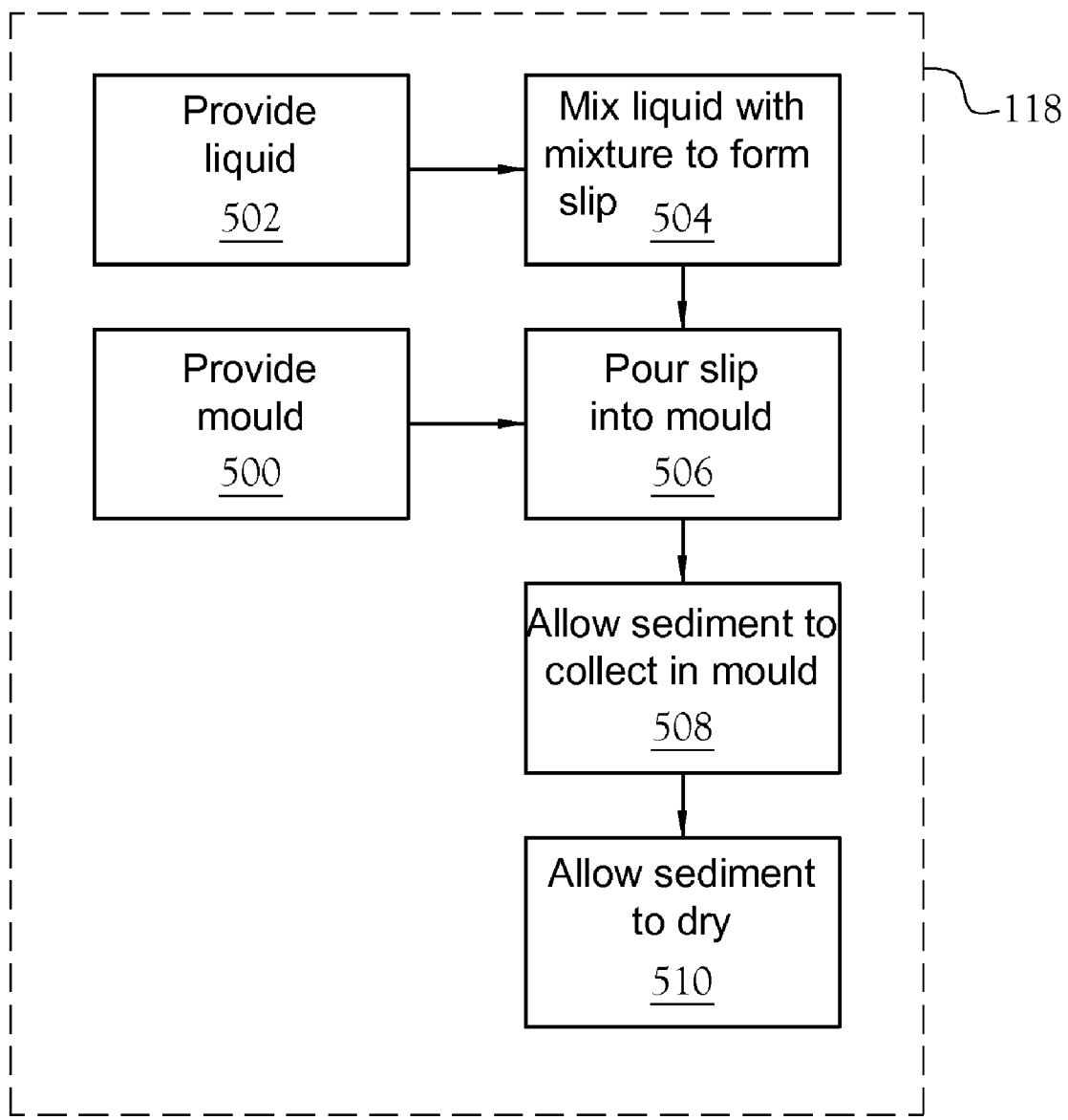
FIG. 5 is a flowchart showing more detailed steps for accomplishing one embodiment of the forming step of FIG. 1.

In one embodiment, the forming step 118 occurs through the process of slip casting, which is depicted in the flow diagram of FIG. 5. A mould is provided 500 which defines a shape corresponding to the desired ballistic armor structure. The mould is fabricated at least partially of a material having a reduced porosity sufficient to substantially discourage the particles of the mixture from permeating the mould. A liquid is provided 502 and mixed 504 with the mixture to form a slip. The slip is then poured 506 into the mould, and the mixture is allowed to precipitate in the form of sediment within the mould 508, thereby forming a cast of the mixture within the mould, conforming to the desired ballistic armor structure. At 510, the liquid is removed from the mould, thus allowing the cast to substantially dry. After the liquid is removed from the mold 510, the mixture remains in the desired ballistic armor structure shape, thereby accomplishing the forming step 118.

In one embodiment of the process invention 100 in which the inert cover is provided 210 by soaking the filler material and carbon in liquid ethanol during the grinding process, such liquid ethanol is used as the slip liquid 502 during the slip casting process. Thus, in one embodiment, the provision of the inert cover 210 is combined with the provision of the slip liquid 502. Those skilled in the art will recognize other substances suitable for providing both the inert cover 210 and the slip liquid 502 in a combined step. Furthermore, those skilled in the art will recognize other methods, such as freeze casting, dry pressing, iso-pressing, extrusion, and other such methods suitable for use to form the mixture 118 into a desired shape. Such methods may be used to accomplish forming of the mixture 118 without departing from the spirit and scope of the present invention.

Referring again to FIG. 1, following forming 118 of the mixture, the formed mixture is placed in a substantial vacuum 120. A pre-selected amount of silicon is provided at 126. The amount silicon is selected to be sufficient to substantially permeate the carbon-coated filler granules and react with the carbon particles. Typically, the pre-selected amount of silicon is selected to have a weight in the range of 40-60% of the weight of the formed mixture. Those skilled in the art will recognize that the amount of silicon may be reduced relative to the pre-selected amount of silicon particulates optionally added at 112.

The mixture is then exposed to the pre-selected amount of silicon 122. The formed mixture and silicon are heated 124 to a temperature at or exceeding the melting point of the silicon, which is approximately 1,414 degrees Centigrade. Upon melting of the silicon, the capillary forces present from the porous nature of the formed mixture act to wick the molten silicon through the formed mixture, whereby the molten silicon substantially permeates among the particles of the mixture. Upon reaching a temperature at or around the melting point of the silicon, the silicon within the mixture, including any silicon particles optionally added at 114, reacts with the free carbon particles substantially coating the filler particles. The silicon and carbon form a substantially continuous phase of fine grained silicon carbide throughout the mixture. Thus, heating of the silicon vapor and the mixture results in the creation of a matrix of silicon carbide with the filler particles suspended within a substantially continuous phase of silicon carbide. At the same time, the reaction of vaporizing silicon with free carbon reduces the formation of structurally weakening degassing channels; the vaporizing silicon forms silicon carbide within the mixture instead of escaping.

Figure 6:
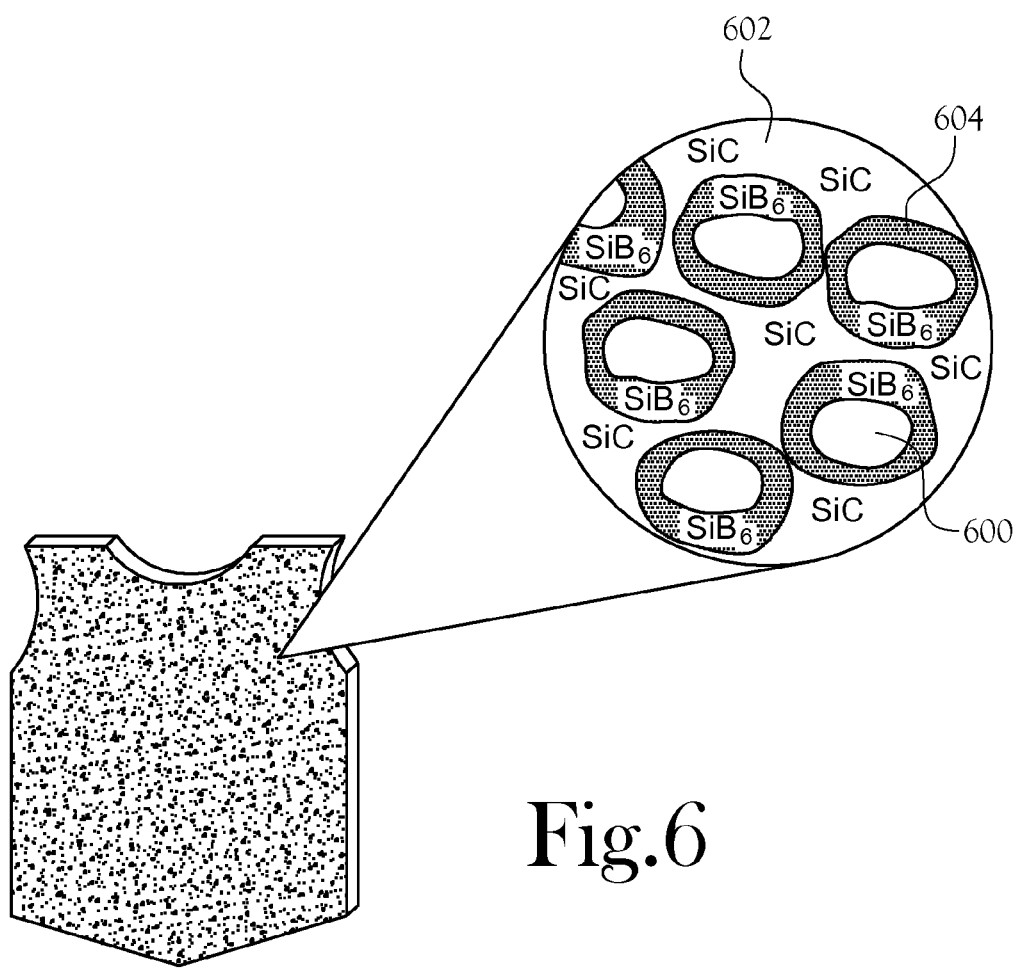
FIG. 6 is a cross-sectional view of a ceramic ballistic armor produced through the method of FIG. 1, showing an enlarged cross-sectional view of a section of the ceramic ballistic armor structure.

FIG. 6 is diagram showing a partially enlarged cross-sectional view of one embodiment of a ceramic ballistic armor of the present invention, in which boron carbide is used as the filler material. In the embodiment of FIG. 6, the ceramic ballistic armor 606 is formed to conform to the ballistic armor structural shape of an insert for an armored vest. Those skilled in the art will recognize that numerous desirable shapes may be accomplished without departing from the spirit and scope of the present invention. It will further be understood that FIG. 6 is merely a schematic diagram, and that relative dimensions of the illustrated particles are not depicted to scale.

As shown in FIG. 6, when boron carbide is used as the filler material, at the same time the silicon and carbon react to form silicon carbide 602, residual silicon within the formed body reacts with boron carbide present in the filler granules to form an expanded lattice boron carbide 600. The expansion of the crystal lattice allows for the insertion of atoms, including but not limited to silicon atoms, into the lattice framework to expand the lattice parameter. Overall, the expansion of the lattice and the insertion of atoms to expand the lattice parameter create a filler material 600 having physical properties more desirable than ordinary boron carbide. The expansion of the lattice also helps to diminish the appearance of gaps within the ceramic mixture.

It should be noted that the formation of the silicon carbide 602 from silicon and carbon is an exothermic reaction which releases an amount of energy into the ceramic body. A portion of the released energy is absorbed by the surrounding filler particles and silicon melt, thereby effectively increasing the local temperature of the formed mixture. Such increase in local temperature of the formed mixture allows for the formation of silicon hexaboride 604, which forms a eutectic microstructure within expanded lattice boron carbide. In embodiments utilizing boron carbide as the filler material, this formation of silicon hexaboride creates throughout the ceramic ballistic armor core/shell microstructures in which the expanded lattice boron carbide 600 is coated in a shell of silicon hexaboride 604.

Figure 7:
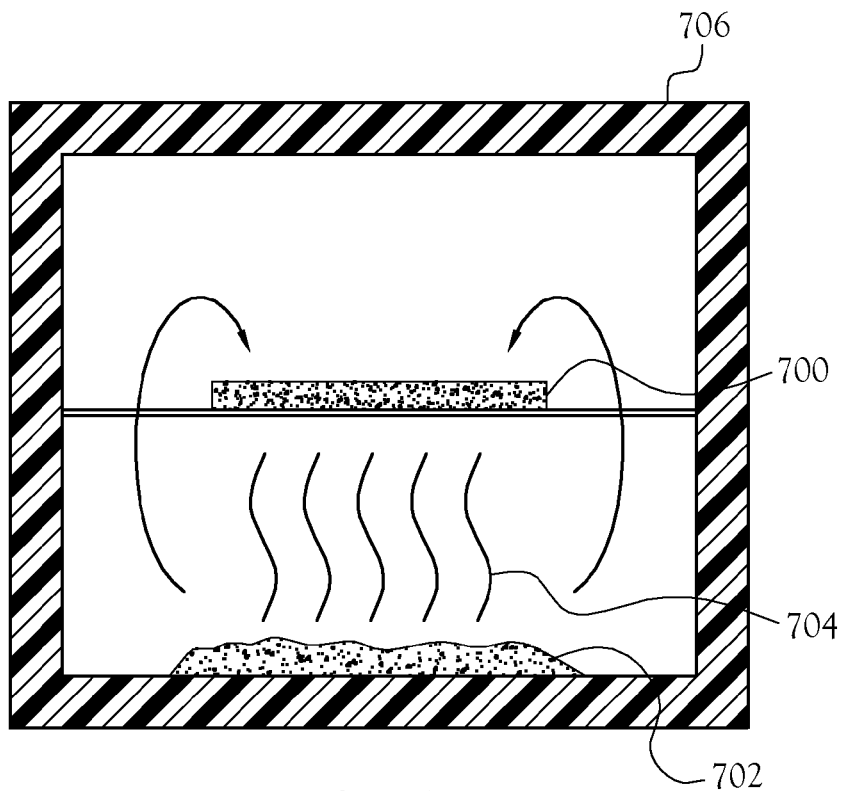
FIG. 7 is a cross-sectional view of a vacuum furnace, shown during the heating step of FIG. 1.
Figure 8:
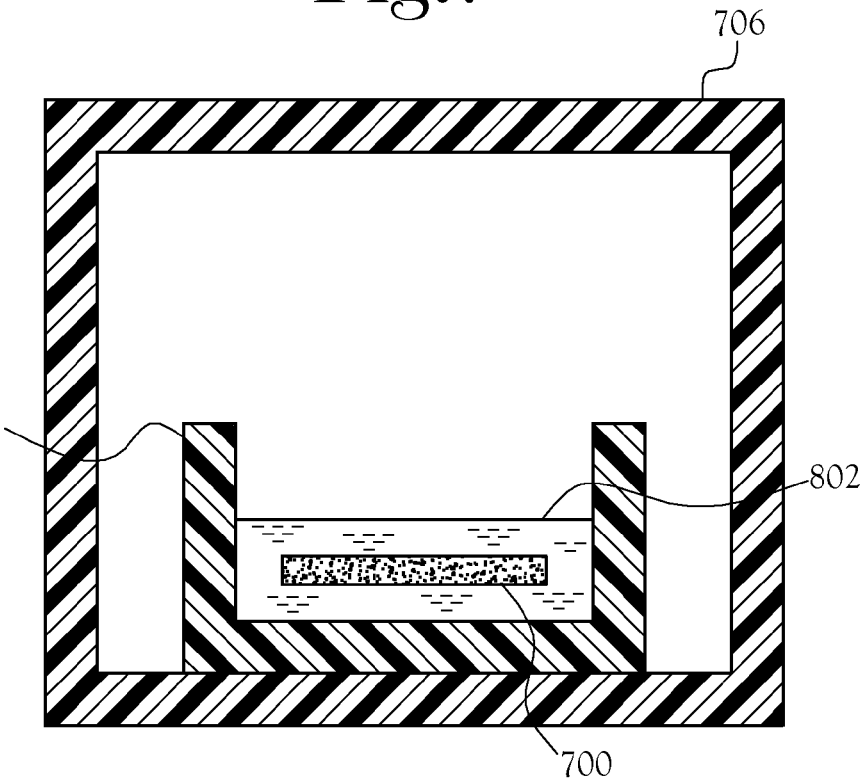
FIG. 8 is a cross-sectional view of a vacuum furnace, shown during another embodiment of the heating step.

In certain embodiments, illustrated in FIGS. 7 and 8, the steps of placing the formed mixture in a substantial vacuum 120, introducing the silicon vapor 122, and heating 124 each occur within the confines of a vacuum furnace 706. As shown in FIG. 6, a vacuum furnace 706 is provided, suitable to contain the formed mixture 700 along with the silicon 702 provided at 112 in FIG. 1. Each of the formed mixture 700 and the silicon 702 is placed into the vacuum furnace 706. The vacuum furnace 706 is then substantially depressurized, and heated to a temperature at or exceeding the vaporization point of silicon. The vacuum furnace 706 thereby heats the silicon 702 until the silicon 702 reaches a vaporous state, the silicon vapor 704 thus substantially filling the vacuum furnace 706. In this manner, the formed mixture 700 is exposed to the silicon vapor 704, and the silicon vapor is allowed to substantially permeate among the particles of the mixture.

FIG. 7 illustrates another configuration of the vacuum furnace. In FIG. 7, a crucible 800 is provided within the vacuum furnace 706. The crucible 800 contains a pre-selected amount of silicon 802. In this embodiment, the formed mixture 700 is exposed to the pre-selected amount of silicon 122 by placing the formed mixture 700 into the crucible 800 containing the silicon 802. The formed mixture and silicon are then heated 124 within the crucible 800 by the vacuum furnace 706 to a temperature at or exceeding the melting point of the silicon, whereby the melted silicon substantially permeates between the particles of the mixture. In this manner, the steps of introducing the silicon 122 and heating the formed mixture and silicon 124 are accomplished within the crucible 800.

As discussed above, during the heating process 124, the silicon vapor 704 permeates the grains of the formed mixture 700 to react with the carbon particles 304 to form silicon carbide. In one embodiment of the method of manufacture 100, the provision of silicon 112 and the provision of carbon 106 occur in a substantially stoichiometrically balanced fashion, such that the silicon 112 is substantially consumed during the formation of the silicon carbide matrix. In another embodiment, sufficient silicon is provided 112 to allow silicon vapor 704 to continue to permeate and accumulate within the formed mixture 700, thereby filling at least a portion of any voids within the silicon carbide matrix with silicon.

From the foregoing description, it will be clear to one of skill in the art that a ceramic ballistic armor including a silicon carbide matrix suspending particulates of filler material is disclosed. The ceramic ballistic armor produced by the process invention 100 contains suspended particulates of filler material having sufficient small grain size, high surface area, and small facets, such that the ceramic material exhibits desirable strength, high weibull modulus, high K1C and attractive dynamic properties, thermal properties, and wear properties for use in ballistic armor applications.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A ceramic ballistic armor, comprising a layer of ballistic ceramic particles dispersed with a continuous phase of silicon carbide,
    wherein said ballistic ceramic particles are substantially coated in silicon hexaboride.
2. The ceramic ballistic armor of claim 1, said ballistic ceramic particles being composed of boron carbide.
3. The ceramic ballistic armor of claim 2, said ballistic ceramic particles generally exhibiting a crystal lattice framework comprising constituent molecules with the chemical formula $B_{12}(B,C,Si)_3$.
4. The ceramic ballistic armor of claim 1, wherein said continuous phase further comprises silicon.
5. The ceramic ballistic armor of claim 1, wherein said ballistic ceramic particles collectively have a median diameter of approximately 10 microns or less.

* * * * *